(12) United States Patent
Shi et al.

(10) Patent No.: US 9,244,648 B2
(45) Date of Patent: Jan. 26, 2016

(54) MULTI-PROCESSOR VIDEO PROCESSING SYSTEM AND VIDEO IMAGE SYNCHRONOUS TRANSMISSION AND DISPLAY METHOD THEREIN

(75) Inventors: Enyi Shi, Hangzhou (CN); Tian Huang, Hangzhou (CN); Xuefeng Qian, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 0 days.

(21) Appl. No.: 14/365,938

(22) PCT Filed: May 29, 2012

(86) PCT No.: PCT/CN2012/076230
§ 371 (c)(1),
(2), (4) Date: Feb. 20, 2015

(87) PCT Pub. No.: WO2013/086838
PCT Pub. Date: Jun. 20, 2013

(65) Prior Publication Data
US 2015/0234632 A1 Aug. 20, 2015

(30) Foreign Application Priority Data

Dec. 16, 2011 (CN) .......................... 2011 1 0422767

(51) Int. Cl.
*G06F 13/14* (2006.01)
*G06F 3/14* (2006.01)
(Continued)

(52) U.S. Cl.
CPC ................ *G06F 3/1446* (2013.01); *G06T 1/20* (2013.01); *H04N 5/04* (2013.01); *H04N 5/265* (2013.01)

(58) Field of Classification Search
CPC ... G06F 3/1446; G06F 9/3877; G06F 3/1438; G06F 13/14; G06F 12/0893; H04N 5/04; H04N 5/265; G06T 1/20
See application file for complete search history.

(56) References Cited

U.S. PATENT DOCUMENTS

| 8,692,937 | B2* | 4/2014 | Altmann ................ H04N 9/475 345/1.3 |
| 2007/0118688 | A1* | 5/2007 | Lee ..................... G06F 12/0868 711/113 |

(Continued)

FOREIGN PATENT DOCUMENTS

| CN | 1889667 | 1/2007 |
| CN | 101866634 | 10/2010 |

(Continued)

*Primary Examiner* — Victor Kostak
(74) *Attorney, Agent, or Firm* — Fish & Richardson P.C.

(57) ABSTRACT

The present invention relates to the field of video processing. Disclosed are a multi-processor video processing system and video image synchronous transmission and display method therein. Via PCIE bus technology, synchronous transmission and tiled display of video image in the multi-CPU system is implemented. In the present invention, the multi-processor system includes multiple processors that are connected via a PCIE bus and each comprises a display unit and a decoding unit; a memory area of the display unit comprises two buffers, a read information packet containing a read flag, and a write information packet containing a write flag. The method includes the following steps: a decoding unit generating a frame of uncompressed image, performing the following steps on each corresponding display unit: if the read and write flags corresponding to the display unit are equal, sending, by calling the PCIE bus or using local transmission, the image to an idle buffer indicated by the write flag, and negating the write flag; each display unit querying for corresponding read and write flags according to a display refresh frequency; if the read and write flags are not equal, using the buffer indicated by the read flag as a storage area for data to be displayed next time, and setting the read flag to a write flag value.

13 Claims, 6 Drawing Sheets

(51) Int. Cl.
*H04N 5/04* (2006.01)
*H04N 5/265* (2006.01)
*G06T 1/20* (2006.01)

(56) References Cited

U.S. PATENT DOCUMENTS

| | | | |
|---|---|---|---|
| 2007/0260796 A1* | 11/2007 | Grossman | G06F 13/24 710/269 |
| 2009/0324108 A1 | 12/2009 | Yan | |
| 2010/0153658 A1* | 6/2010 | Duncan | G06F 13/1663 711/145 |
| 2011/0210975 A1* | 9/2011 | Wong | G09G 5/363 345/503 |
| 2011/0219208 A1* | 9/2011 | Asaad | G06F 9/06 712/12 |
| 2012/0005410 A1* | 1/2012 | Ikeuchi | G06F 11/2087 711/103 |
| 2012/0235922 A1* | 9/2012 | Locker | G06F 3/1462 345/173 |
| 2014/0129767 A1* | 5/2014 | Ramanujan | G06F 12/0897 711/105 |
| 2014/0253413 A1* | 9/2014 | Nair | G06F 3/1446 345/1.3 |

FOREIGN PATENT DOCUMENTS

| | | |
|---|---|---|
| CN | 101937326 | 1/2011 |
| CN | 101986258 | 3/2011 |
| CN | 102226943 | 10/2011 |
| CN | 102270444 | 12/2011 |

\* cited by examiner

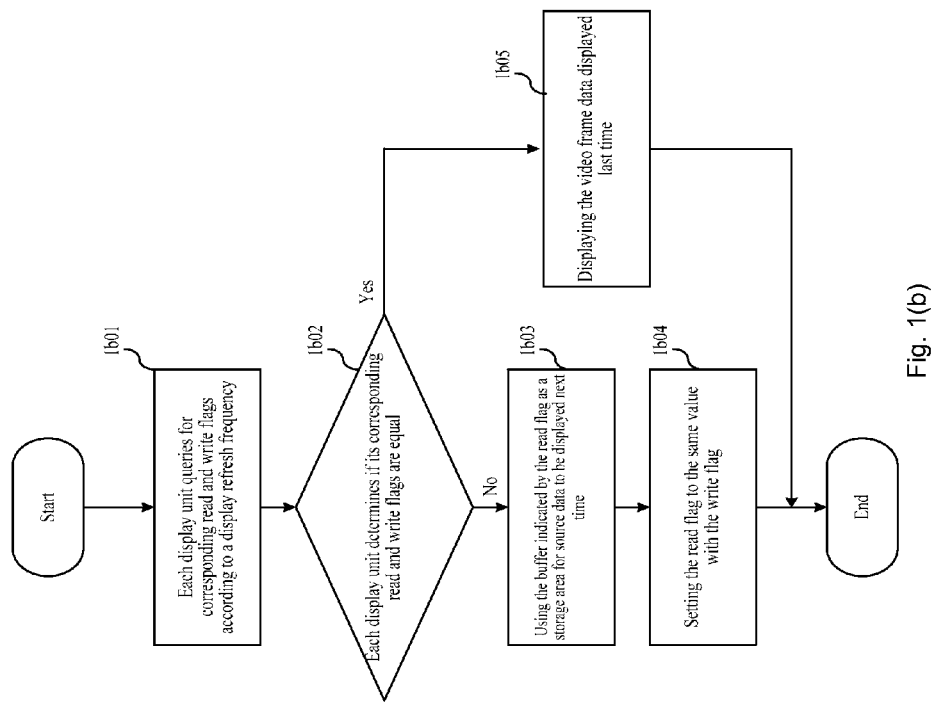
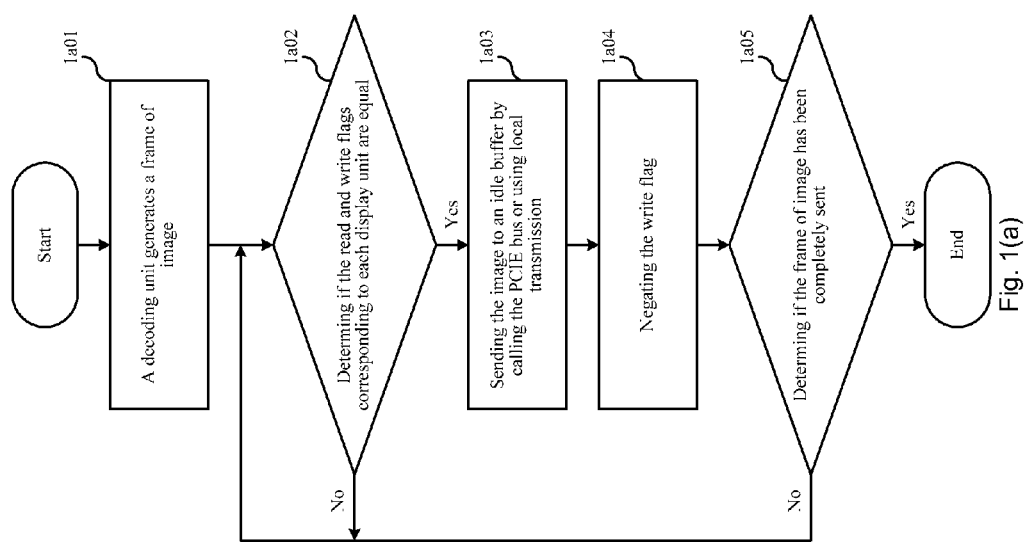
Fig. 1(b)
Fig. 1(a)

| Step | RDIF | | WRIF | | State | |
|---|---|---|---|---|---|---|
| | r | w | r | w | BUF0 | BUF 1 |
| S1,S2,S3 | 0 | 0 | 0 | 0 | I | I |
| S4,S5,S6,S7,S8 | 0 | 0 | 0 | 1 | R | I |
| S9 | 1 | 1 | 0 | 1 | B | I |
| S4,S5,S6,S7,S8 | 1 | 1 | 1 | 0 | B | R |
| S9 | 0 | 0 | 1 | 0 | I | B |
| S4,S5,S6,S7,S8 | 0 | 0 | 0 | 1 | R | B |
| S9 | 1 | 1 | 0 | 1 | B | I |
| S4,S5,S6,S7,S8 | 1 | 1 | 1 | 0 | B | R |
| S9 | 0 | 0 | 1 | 0 | I | B |
Fig.5
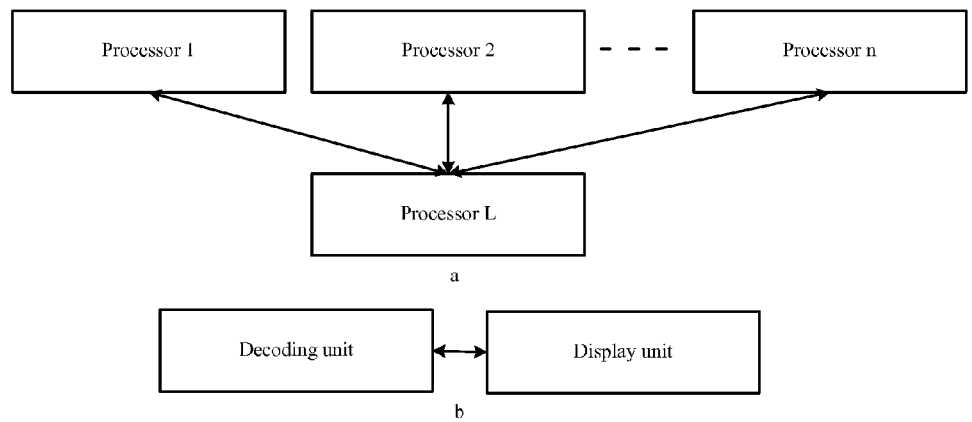
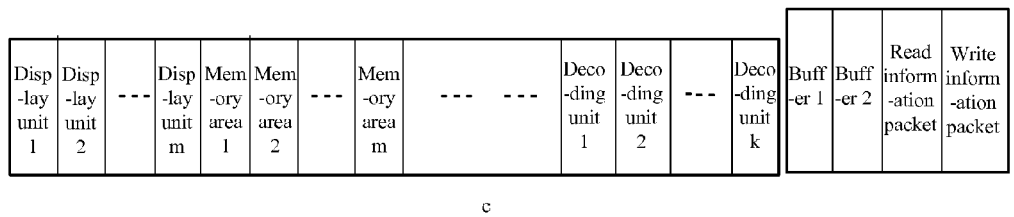
Fig.6

MULTI-PROCESSOR VIDEO PROCESSING SYSTEM AND VIDEO IMAGE SYNCHRONOUS TRANSMISSION AND DISPLAY METHOD THEREIN

FIELD OF THE INVENTION

The present invention relates to the field of video processing, particularly relates to multi-CPU video processing technology.

BACKGROUND OF THE INVENTION

In the multi-CPU video processing system, real-time transmission of uncompressed video data is often the key link leading to the system performance bottleneck. A "general CPU and specialized processing chip" system structure is usually utilized for application focusing on data transmission, such as video stitching control, wherein the specialized processing chip concentrates on handling data receiving and processing to ensure real time of the processing.

In the prior art, a Chinese patent application with publication number CN 101986258 A has disclosed a technical solution of "general CPU and specialized processing chip" system structure for video stitching. However, the inventors of the present invention have found that said invention patent cannot be implemented in the peer star structure of peer multi-CPU system, though it can be implemented in such system structure as "general CPU plus specialized processing chip".

Therefore, a video processing technology for the peer structure of a multi-CPU system is desired.

SUMMARY OF THE INVENTION

The purpose of the present invention is to provide a multi-processor video processing system and video image synchronous transmission and display method therein. Read and write information packets and corresponding read and write flags are respectively set in each group of memory area such that the states of the two buffers in the memory area can be determined to avoid redundant operations, like rewriting and rereading the display unit's buffers and resending by the decoding unit etc, and facilitate the concurrent operations for the display of the display units and image data transmission by the decoding units. When a high capacity video image is transmitted, synchronous transmission and seamless tiled synchronous display of video image can be implemented by the multi-processor video processing system using this method.

To solve the above technical problems, one embodiment of the present invention discloses a video image synchronous transmission and display method in a multi-processor video processing system, the system includes multiple processors which are connected via a PCIE bus, each processor comprises one or more display units and one or more decoding units, each display unit respectively comprises a corresponding group of memory area, each group of memory area comprises two buffers, a read information packet and a write information packet, the read information packet contains a read flag, and the write information packet contains a write flag; each decoding unit corresponds to one or more display units; the read information packet corresponding to the display unit is read-only for the decoding unit, and the write information packet corresponding to the display unit can be read and written by the decoding unit, whereas the read information packet corresponding to the display unit can be read and written by the display unit, and the write information packet corresponding to the display unit is read-only for the display unit;

the method includes the following steps:

the decoding unit generating a frame of uncompressed image and respectively performing the following steps on each display unit corresponding to the decoding unit:

if the read and write flags corresponding to the display unit are equal, sending the image belonging to the display unit to an idle buffer indicated by the write flag by calling the PCIE bus or using local transmission inside the processor, and negating the write flag, otherwise waiting until the read flag is equal with the write flag;

each display unit querying for corresponding read and write flags according to a display refresh frequency, if the read flag is not equal with the write flag, using the buffer indicated by the read flag as a storage area for source data to be displayed next time, and setting the read flag to the same value with the write flag.

Another embodiment of the present invention also discloses a video image synchronous display method, a multi-processor video processing system includes multiple processors which are connected via a PCIE bus, each processor comprises one or more display units and one or more decoding units, each display unit respectively comprises a corresponding group of memory area, each group of memory area comprises two buffers, a read information packet and a write information packet, the read information packet contains a read flag, and the write information packet contains a write flag; each decoding unit corresponds to one or more display units; the corresponding read information packet is read-only for the decoding unit, and the write information packet corresponding to the display unit can be read and written by the decoding unit, whereas the read information packet corresponding to the display unit can be read and written by the display unit, and the write information packet corresponding to the display unit is read-only for the display unit.

the multi-processor video processing system further includes a synchronous transmission module having several synchronous channels;

the method utilized by the synchronous transmission module includes the following steps: traversing every synchronous channel, and if current synchronous channel has been enabled, performing the following steps on each display unit corresponding to the synchronous channel:

if it is required to send image to the display unit and there is an idle buffer in the memory area corresponding to the display unit, sending the image to the idle buffer of the display unit by calling the PCIE bus or using local transmission inside the processor;

if all images of the current synchronous channel have been sent, sending a synchronous information packet of the current synchronous channel and disabling the current synchronous channel.

Another embodiment of the present invention also discloses a multi-processor video processing system utilizing video image synchronous transmission and display method, the system includes multiple processors which are connected via a PCIE bus, each processor comprises one or more display units and one or more decoding units, each display unit respectively comprises a corresponding group of memory area, each group of memory area comprises two buffers, a read information packet and a write information packet, the read information packet contains a read flag, and the write information packet contains a write flag; each decoding unit corresponds to one or more display units; the read information packet corresponding to the display unit is read-only for the decoding unit, and the write information packet corresponding to the display unit can be read and written by the decoding unit, whereas the read information packet corresponding to the display unit can be read and written by the display unit, and the write information packet corresponding to the display unit is read-only for the display unit.

the decoding unit is used for generating a frame of uncompressed image and respectively performing the following steps on each display unit corresponding to the decoding unit:

if the read and write flags corresponding to the display unit are equal, sending the image belonging to the display unit to an idle buffer indicated by the write flag by calling the PCIE bus or using local transmission inside the processor, and negating the write flag, otherwise waiting until the read flag is equal with the write flag;

the display unit is used for querying for corresponding read and write flags according to a display refresh frequency, if the read flag is not equal with the write flag, the display unit uses the buffer indicated by the read flag as a storage area for source data to be displayed next time and sets the read flag to the same value with the write flag.

Comparing the embodiments of the present invention with prior arts, the main differences and their effects are: simultaneously and transparently presenting the state of a display unit's buffer to a data transmitting end is implemented by setting ping-pang buffers, their information packets and read and write flags therein.

Based on peer multi-CPU system and PCIE bus technology, a synchronous transmission protocol is designed and achieved such that freely configurable video stitching function can be implemented and screen synchronization is ensured.

Read and write information packets and corresponding read and write flags are respectively set in each group of memory area such that the states of the two buffers in the memory area can be determined to avoid redundant operations, like rewriting and rereading the display unit's buffers and resending by the decoding unit, etc, and to facilitate the concurrent operations for the display of the display units and the image data transmission of the decoding units. When a high capacity of video images are transmitted, the multi-processor video processing system using this method can implement synchronous transmission and seamless tiled synchronous display of video image.

The synchronous information packet is received after the display unit(s) has received all the image data of the current synchronous channel, which allows the display unit(s) to display the image data simultaneously.

Further, when a decoding unit sets M*N (M, N are positive integers) tiled display, the decoding unit can select corresponding display units and their number according to the video image's size and addresses and sizes of two buffers in the display unit's corresponding memory area.

Further, the address of the image buffer in the information packet utilizes an offset mode relative to the information head, which enables the data transmission method, no matter PCIE bus transmission or local memory copy, to flexibly handle the buffer's address. If absolutely physical address is utilized, the address can be transformed once by PCIE bus alone, and if relative address is utilized, the buffer's address can be obtained by directly adding an offset to the information header's address without requirement of recalculating the buffer's location through system calls since the information header's address has been calculated.

Further, the image is sent to the display unit's idle buffer by calling a PCIE bus or using local transmission, which can make full use of display unit resources of the PCIE bus connection and local display units, and largely enhances utilization of display units when M*N stitching is required.

Further, while all synchronous channels of the synchronous transmission module are not enabled or the display unit has not found idle buffers, the synchronous transmission module sleeps for 1 ms.

BRIEF DESCRIPTION OF DRAWINGS

FIG. 1(a) is a flowchart for a video image synchronous transmission and display method in a multi-processor video processing system in the first embodiment of the present invention;

FIG. 1(b) is a flowchart for a video image synchronous transmission and display method in a multi-processor video processing system in the first embodiment of the present invention;

FIG. 5 is a schematic diagram of the table for the information packet's read and write flags and the buffers' state transitions of a video image synchronous display method in the fourth embodiment of the present invention;

FIG. 6(a) is a schematic structure diagram of a multi-processor video processing system for video image synchronous transmission and display in the fifth embodiment of the present invention;

FIG. 6(b) is a schematic structure diagram of a decoding unit and a display unit which transmit data in a multi-processor video processing system for video image synchronous transmission and display in the fifth embodiment of the present invention;

FIG. 6(c) is a schematic structure diagram of a processor of a multi-processor video processing system for video image synchronous transmission and display in the fifth embodiment of the present invention;

DETAILED DESCRIPTION OF THE PREFERRED EMBODIMENTS

Figure 2:
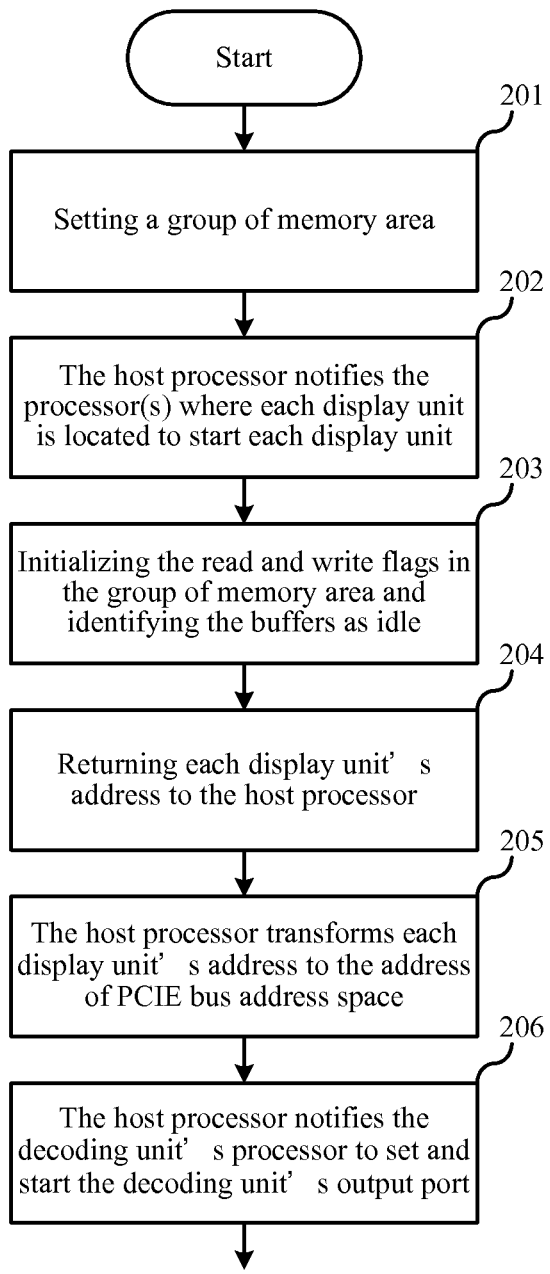
FIG. 2 is a flowchart for a video image synchronous transmission and display method in a multi-processor video processing system in the second embodiment of the present invention.

In the following description, numerous technical details are provided for readers to better understand the application. However, it will be understood by one of ordinary skilled in the art that the technical solution claimed to be protected by those claims of this application can also be realized even without these technical details and not based on various changes and modifications of the following embodiments.

For the purpose, technical solution and merits of the present invention to be clearer, the following will further describe the embodiments of the present invention in detail with reference to the drawings.

The first embodiment of the present invention relates to a video image synchronous transmission and display method in a multi-processor video processing system. FIG. 1(a) and FIG. 1(b) illustrate flowcharts for a video image synchronous transmission and display method in a multi-processor video processing system. The video image synchronous transmission and display method in the multi-processor video processing system, the system includes multiple processors which are connected via a PCIE bus, each processor comprises one or more display units and one or more decoding units, each display unit respectively comprises a corresponding group of memory area, each group of memory area comprises two buffers, a read information packet and a write information packet, the read information packet contains a read flag, and the write information packet contains a write flag. Each decoding unit corresponds to one or more display units. The read information packet corresponding to the display unit is read-only for the decoding unit, and the write information packet corresponding to the display unit can be read and written by the decoding unit, whereas the read information packet corresponding to the display unit can be read and written by this display unit, and the write information packet corresponding to the display unit is read-only for this display unit.

Read and write information packets and corresponding read and write flags are respectively set in each group of memory area such that the states of the two buffers in the memory area can be determined to avoid redundant operations, like rewriting and rereading the display unit's buffers and resending by the decoding unit etc, and facilitate the concurrent operations for the display of the display units and image data transmission of the decoding units. When a high capacity of video images are transmitted, synchronous transmission and seamless tiled synchronous display of video image can be implemented by the multi-processor video processing system using this method. Wherein, video stitching which is also referred as large-screen splicing or tiled display, displays an image through multiple displayers, each displayer only displaying a part of the image and multiple displayers being arranged in sequence to form a complete screen.

Synchronous transmission of a large number of video data is implemented by setting ping-pang buffering, two information packets and their read and write flags, so that the video stitching in the multi-CPU architecture can be accomplished.

Specifically, as shown in FIG. 1(a) and FIG. 1(b), the video image synchronous transmission and display method in the multi-processor video processing system includes the following steps:

As shown in FIG. 1(a):

In step 1a01, the decoding unit generates a frame of uncompressed image and the following steps 1a02, 1a03, 1a04 and 1a05 are respectively performed on each display unit corresponding to the decoding unit:

Then it enters into step 1a02, the decoding unit determines if the read and write flags corresponding to each display unit are equal.

If the read flag is equal with the write flag, then it enters into step 1a03; otherwise, it returns to step 1a02 to continue determining if the read and write flags corresponding to each display unit are equal, until the read flag is equal with the write flag when it enters into step 1a03.

In step 1a03, if the read and write flags corresponding to the display unit are equal, which denotes the buffer indicated by the write flag being in idle state, the decoding unit sends the image belonging to the display unit to an idle buffer indicated by the write flag by calling the PCIE bus or using local transmission inside the processor.

Based on PCIE bus technology, a requirement for maximum transmission of video data is satisfied on transmission bandwidth and a synchronization protocol is designed and achieved, so that such application as video stitching control can be implemented in the multi-CPU system. Bus and interface standard (Peripheral Component Interconnection Express, referred as "PCIE" or "PCI-E") is a bus standard provided by the Interl company, in which time frequency is 2.5G or 5.0G, two-way serial transmission mode is utilized and point-to-point transmission is supported, and the data transmission performance has been largely enhanced compared to the PCI bus.

Then it enters into step 1a04, the decoding unit negates the write flag.

As a preferred embodiment of the present invention, the step of the decoding unit negating each write flag includes rewriting the negated write flag into the write flag in the write information packet of corresponding display unit.

Then it enters into step 1a05, the decoding unit determines if the generated frame of image has been completely sent.

If the generated frame of image has not been sent, it returns to step 1a02 to continue determining if the read and write flags corresponding to each display unit are equal; if the generated frame of image has been completely sent, then the flow ends.

In the other embodiments of the present invention, the above step 1a05 can not be performed as long as the decoding unit has sent the frame of video image and all the display unit(s) will receive new date at same time, then the flow ends. Meanwhile, if the above step 1a05 is not performed, steps 1a02, 1a03 and 1a04 denote that corresponding operations can be completely performed on the frame of the image and the display unit(s) corresponding to the decoding unit will receive new data of video image at the same time.

As shown in FIG. 1(b):

In step 1b01, each display unit queries for corresponding read and write flags according to a display refresh frequency.

Then it enters into step 1b02, each display unit determines if found read and write flags are equal.

If the read flag is not equal with the write flag, then it enters into step 1b03; otherwise, it enters into step 1b05.

In step 1b03, if the read flag is not equal with the write flag, the display unit uses the buffer indicated by the read flag as a storage area for source data to be displayed next time.

Then it enters into step 1b04, the display unit simultaneously sets the read flag to the same value with the write flag, then the flow ends.

In step 1b05, if the read flag is equal with the write flag, which denotes that the buffer indicated by the read flag has not new data to be displayed, the display unit repeatedly outputs the image data output last time, and then the flow ends.

The second embodiment of the present invention relates to a video image synchronous transmission and display method in a multi-processor video processing system. FIG. 2 illustrates a flowchart for a video image synchronous transmission and display method in a multi-processor video processing system.

The second embodiment improves the first embodiment, and the main improvements are described below: when a decoding unit sets M*N (M, N are positive integers) tiled display, the decoding unit can select corresponding display units and their number according to the video image's size and addresses and sizes of two buffers in the display unit's corresponding memory area. The address of the image buffer in the information packet utilizes an offset mode relative to the information header, which enables the data transmission method, no matter PCIE transmission or local memory copy, to flexibly handle the buffer's address; if absolutely physical address is utilized, the address can be transformed once by PCIE alone, and if relative address is utilized, the buffer's address can be obtained by directly adding an offset to the information header's address without requirement of recalculating the buffer's location through system calls since the information header's address has been calculated. Specifically:

The read and write information packets further include the video image's size, the addresses and sizes of the two buffers in the memory area where the read and write information packets are located. The addresses of the two buffers in the memory area corresponding to the read information packet and the write information packet utilize an offset mode.

Before the step of the decoding unit performing video image synchronous transmission on each display unit corresponding to the decoding unit, the steps of system initialization shown in FIG. 2 is further included:

In step 201, the multi-processor video processing system respectively sets a group of memory area corresponding to each display unit in a memory space of the processor(s) where each display unit is located.

Then it enters into step 202, the host processor of the multi-processor video processing system notifies the processor(s) where each display unit is located to start each display unit.

Then it enters into step 203, the processor(s) where each display unit is located initializes the read and write flags in the group of memory area and identifies the two buffers in this group of memory area as idle.

Then it enters into step 204, after initializing the read and write flags in the group of memory area and identifying the two buffers in this group of memory area as idle, the processor(s) where each display unit is located returns each display unit's address to the host processor.

Then it enters into step 205, the host processor transforms each display unit's address to the address of PCIE bus address space.

The system includes multiple processors that are connected via a PCIE bus, wherein one of which is also a host processor.

The processor which is also a host processor can be either one of the multiple processors participating in synchronous transmission and tiled display, or another independent processor. When the processor which is also a host processor acts as the host processor, it is only responsible for sending commands and does not participate in function implementation; when the processor which is also a host processor does not act as the host processor, it only participates in function implementation and does not send commands. Wherein, the processor which is also a host processor may be connected with other processors either by PCIE, or through other means like network etc.

Then it enters into step 206, the host processor notifies the decoding unit's processor to set and start the decoding unit's output port, and then it enters into the step of the above decoding unit performing video image synchronous transmission on each display unit corresponding to the decoding unit. Wherein, the output port's port information set by the decoding unit's processor includes each display unit's address of PCIE bus address space, display screen's size and the display screen's location in the original frame of image, the original frame of image's area size.

The third embodiment of the present invention relates to a video image synchronous display method. The multi-processor video processing system includes multiple processors which are connected via a PCIE bus; each processor comprises one or more display units and one or more decoding units; each display unit respectively comprises a corresponding group of memory area; each group of memory area comprises two buffers a read information packet and a write information packet; the read information packet contains a read flag and the write information packet contains a write flag; each decoding unit corresponds to one or more display units. The read information packet corresponding to the display unit is read-only for the decoding unit, and the write information packet corresponding to the display unit can be read and written by the decoding unit, whereas the read information packet corresponding to the display unit can be read and written by this display unit, and the write information packet corresponding to the display unit is read-only for this display unit.

Figure 3:
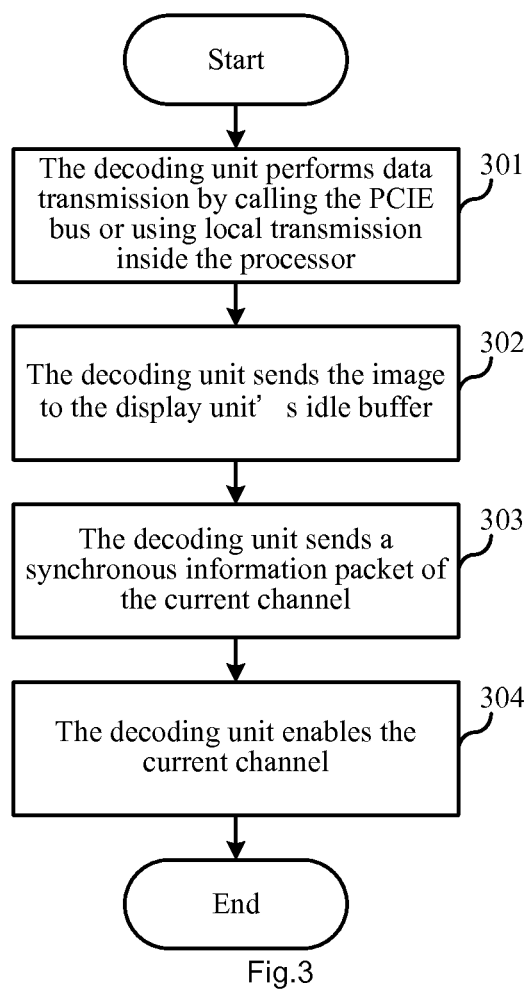
FIG. 3 is a flowchart for a video image synchronous display method in the third embodiment of the present invention.

The multi-processor video processing system further includes a synchronous transmission module having several synchronous channels. FIG. 3 illustrates a flowchart for a video image synchronous display method. Specifically, as shown in FIG. 3, the synchronous display method utilized by the synchronous transmission module includes the following steps:

The decoding unit traverses every synchronous channel, and if the current synchronous channel has been enabled, the following steps are performed on each display unit corresponding to this synchronous channel:

In step 301, if it is required to send image to the display unit and there is an idle buffer in the memory area corresponding to the display unit, data transmission is performed by calling the PCIE bus or using local transmission inside the processor.

Then it enters into step 302, the decoding unit sends the image to the display unit's idle buffer.

Then it enters into step 303, if all images of the current synchronous channel have been sent, the decoding unit sends a synchronous information packet of the current synchronous channel.

The synchronous information packet is received after the display unit(s) has received all the image data of the current synchronous channel, which allows the display unit(s) to display the image data simultaneously.

Then it enters into step 304, the decoding unit disables the current synchronous channel, and then the flow ends.

The fourth embodiment of the present invention relates to a video image synchronous display method.

The fourth embodiment improves the third embodiment, and the main improvements are described below: the image is sent to the display unit's idle buffer by calling a PCIE bus or using local transmission, which can make full use of display unit resources of the PCIE bus connection and local display units and largely enhances use efficiency of display units when M*N stitching is required. While all synchronous channels of the synchronous transmission module are not enabled or the display unit has not found idle buffers, the synchronous transmission module sleeps for 1 ms. Specifically:

In the step of sending image to the display unit's idle buffer by calling the PCIE bus or using local transmission, if the decoding unit and the display unit are in the same processor, the image is sent to the display unit's idle buffer by using local transmission inside the processor, and if the decoding unit and the display unit are not in the same processor, the image is sent to the display unit's idle buffer by calling the PCIE bus transmission.

After a frame of uncompressed image is generated by the decoding unit, a synchronous channel is enabled first, and the address of PCIE bus address space for the display unit(s) corresponding to this synchronous channel and this frame of image data are submitted to this synchronous channel, then a synchronous command is submitted to the synchronous channel.

The display unit queries if new video data has appeared in the buffer according to a video display refresh frequency. If new video data has appeared, the video data is displayed, later the buffer storing this video data is set to occupied state, and the buffer occupied last time is set to idle state.

In some other embodiments of the present invention, a few corresponding external interfaces can be set between the decoding unit and the display unit(s), which are respectively used to perform corresponding operation so that data transmission and information packet processing can be easily achieved. As shown in the following:

ITF0: the display unit queries if new video data has appeared in the buffer according to a video display refresh frequency. If new video data has appeared, the video data is displayed, later the buffer storing this video data is set to an occupied state, and the buffer occupied last time is set to an idle state.

ITF1: after a frame of uncompressed image is generated by the decoding unit, an idle synchronous channel is requested and enabled.

ITF2: the address of PCIE bus address space and the video image data are submitted to the synchronous channel enabled by the decoding unit.

ITF3: after submitting the address of PCIE bus address space and the video image data to the synchronous channel, the decoding unit also submits the synchronous command to this synchronous channel for synchronous display and transmission.

All operations required by the decoding unit and the display unit(s) have been packed by ITF0-ITF3 without requirement of knowing the other side's implementation detail.

While all synchronous channels of the synchronous transmission module are not enabled or the display unit has not found idle buffers, the synchronous transmission module sleeps for 1 ms.

In some other embodiments of the present invention, if all synchronous channels of the synchronous transmission module are not enabled or the display unit has not found idle buffers, the sleep time of the synchronous transmission module can be set according to the actual situation, such as 0-1 ms or larger than 1 ms.

Figure 4:
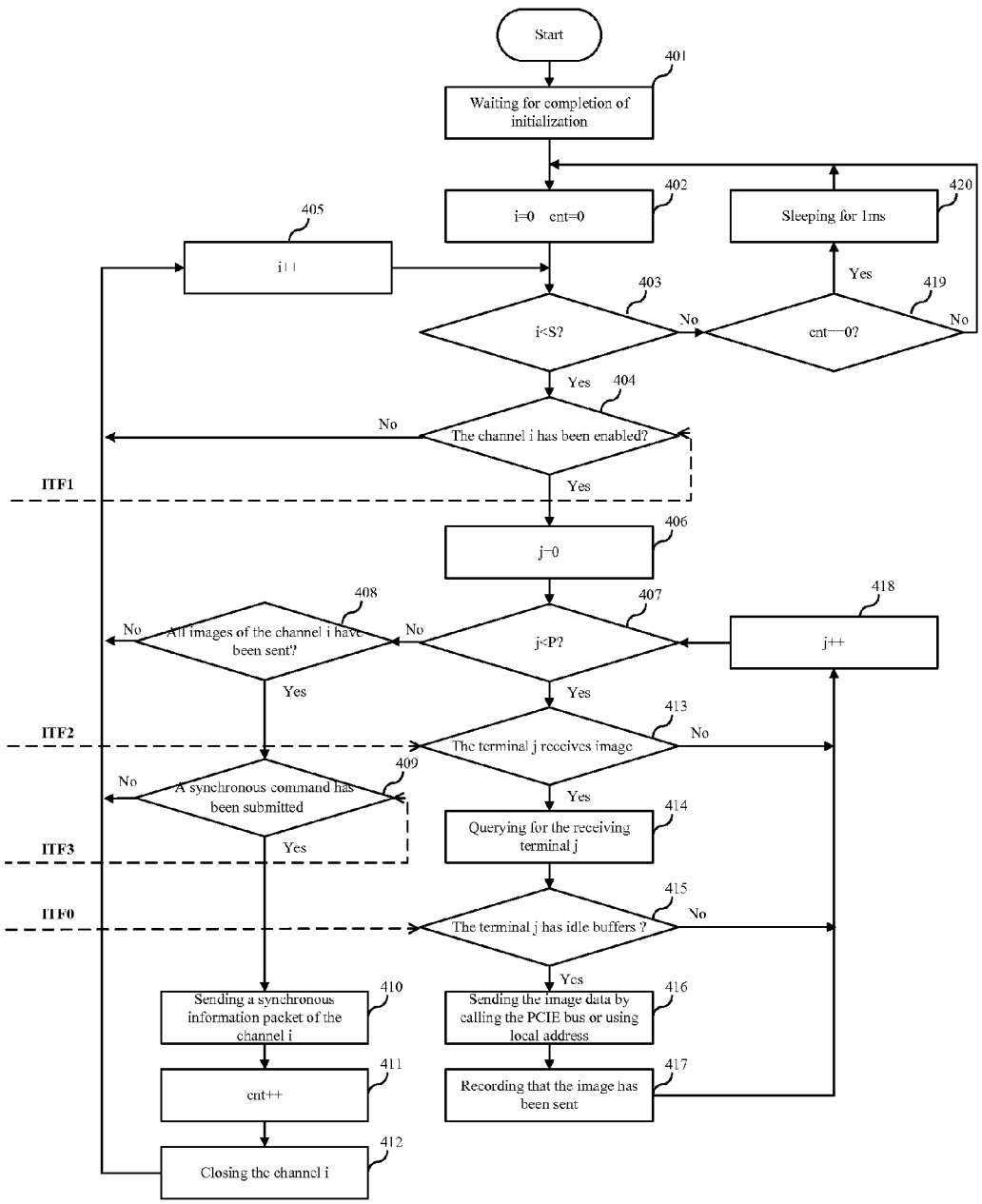
FIG. 4 is a flowchart for a video image synchronous display method in the fourth embodiment of the present invention.

As a preferred embodiment of the present invention, FIG. 4 illustrates a flowchart for a video image synchronous display method in the fourth embodiment of the present invention, as shown in FIG. 4:

In step 401, the synchronous transmission module waits for the multi-CPU video processing system initialization.

Then it enters into step 402, when the decoding unit requires to send video image data to the display unit, the synchronous transmission module traverses and queries for available (or idle and disabled) synchronous channels for transmitting this video image data, i.e. setting i=0, cnt=0, starting from the synchronous channel with the synchronous channel sequence number i as 0. Wherein i denotes sequence number of the current synchronous channel, and cnt is used for counting the number of the synchronous channel(s) having transmitted video image data in a complete traversal process for each synchronous channel.

Then it enters into step 403, whether the current synchronous channel i is smaller than the decoding unit number S (or the number of the available synchronous channels for the decoding unit) is determined.

If i is smaller than S, then it enters into step 404; otherwise, it enters into step 419.

In step 404, whether the current synchronous channel i has been enabled is determined.

If the current synchronous channel i has been enabled, then it enters into step 406; otherwise, it enters into step 405.

In step 405, the synchronous channel with next sequence number is chosen as the current synchronous channel i, and then it returns to step 403 to continue determining whether the current synchronous channel i is smaller than the decoding unit number S.

In step 406, the display unit j with which the decoding unit requires to transmit data is traversed and queried for, starting from the synchronous channel with the display unit sequence number j as 0.

Then it enters into step 407, whether the current display unit j is smaller than the number P of total display units with which the decoding unit requires to transmit data is determined.

If j is smaller than P, then it enters into step 413; otherwise, it enters into step 408.

In step 408, if the current display unit j is not the corresponding display unit with which the decoding unit requires to transmit data, whether all video image data of the current synchronous channel i have been completely sent is determined.

If all video image data of the current synchronous channel i have been completely sent, then it enters into step 409; otherwise, it returns to step 405 to choose the synchronous channel with next sequence number as the current synchronous channel i and continue sending the rest video image data.

In step 409, if the video image data of the current synchronous channel i have been completely sent, whether a synchronous command has been submitted is determined.

If the synchronous command has been submitted, then it enters into step 410; otherwise, it returns to step 405 to choose the synchronous channel with next sequence number as the current synchronous channel i and continue sending the rest video image data or a synchronous command.

In step 410, the synchronous information packet of the current synchronous channel i is sent.

Then it enters into step 411, while the current synchronous channel i has sent the video image data, cnt which is used for counting the number of the synchronous channels having transmitted video image data in a complete traversal process for each synchronous channel is accumulated by one.

Then it enters into step 412, the current synchronous channel i is closed, and then it returns to step 405 to choose the synchronous channel with next sequence number as the current synchronous channel i and continue sending the video image data.

In step 413. If the current display unit j is smaller than the number P of total display units with which the decoding unit requires to transmit data, whether the display unit j is required to receive video image data is continued to determine.

If the display unit j is required to receive video image data, then it enters into step 414; otherwise, it enters into step 418.

In step 414, the display unit j is queried for based on the display unit sequence number j to transmit the video image data.

Then it enters into step 415, whether the current display unit j (or terminal j) has idle buffers is determined.

If the current display unit j has an idle buffer, it enters into step 416; otherwise, it enters into step 418.

In step 416, the decoding unit calls the PCIE bus or uses local transmission to send the video image data to the current display unit j through the current synchronous channel i.

Then it enters into step 417, that the video image data which is sent to the current display unit has been completely sent is recorded.

Then it enters into step 418, the display unit with next sequence number is chosen as the current display unit j and the rest video image data of the current synchronous channel i is continued to receive. Then it returns to step 407 to continue determining whether the current display unit j is smaller than the number P of total display units with which the decoding unit requires to transmit data.

In step 419, if there is no idle synchronous channel currently, i.e. i>=S, whether the number cnt of the synchronous channels having transmitted video image data in a complete traversal process (i.e. P*S number of traverses) is zero is continued to determine.

If cnt is zero, which denotes that no any synchronous channel has transmitted video image data in a complete traversal process with P*S number of traverses, then it enters into step 420; otherwise it denotes that there are cnt number of synchronous channel(s) having transmitted video image data in a complete traversal process with P*S number of traverses, then it returns to step 402 where available (or idle and disabled) synchronous channels for transmitting this video image data are traversed and queried for when the decoding unit requires to send video image data to the display unit, i.e. setting i=0, cnt=0, starting from the synchronous channel with the synchronous channel sequence number i as 0. Wherein i denotes the current synchronous channel sequence number, and cnt is used for counting the number of the synchronous channels having transmitted video image data in a complete traversal process for each synchronous channel.

In step 420, sleeping for 1 ms, and then it returns to step 402.

As a preferred embodiment of the present invention, FIG. 5 illustrates a schematic diagram of the table for the information packet's read and write flags and the buffers' state transitions of a video image synchronous display method in the fourth embodiment of the present invention.

At the system initialization phase, the following steps 1 to 3 are included:

1. For each display unit DISPi (i=1, 2, 3 . . . ), a memory area (marked as SINKi) referred as "display terminal" is created in itself processor's memory space. Each SINKi comprises of one read and write information header and two image buffers, one of these two image buffers being used for current display, the other being used for storing new video image data, wherein the information header includes one slave read information packet (marked as RDIFi) and one slave write information packet (marked as WRIFi), the structures of RDIFi and WRIFi are same and each contains one read flag r, one write flag w, two image buffers' offset addresses and some other parameters for identifying the image's and the buffers' sizes. The two image buffers' states can be determined by r and w in these two information packets, and read and write flags of the information packets and the buffers' state transitions are shown in FIG. 5, Si representing step i, BUF representing buffer, I representing Idle which denotes that the buffer is in idle state, R representing Ready which denotes that the buffer has new data, B representing Busy which denotes that a display is being output. RDIF-r represents the buffer having been read by the display unit, WDIF-w represents the BUF which should be written by the decoding unit next time, and RDIF-w and WDIF-r are a little redundant, as RDIF-w and RDIF-r are always same, and WDIF-r and WDIF-w are always opposite except for the initial conditions, the decoding unit only reads from the RDIF and only writes to the WRIF.

2. The host processor sends commands to certain processor CPUd and notifies starting display function of certain display unit DISPi. The CPUd first initializes the read and write flags of RDIFi and WRIFi in SINKi as zero, which denotes that the two image buffers are both in "idle" state; then the address of SINKi is returned to the host processor.

3. The host processor transforms SINKi to the address PCISINKi of PCIE address space, then the host processor sends commands to certain processor CPUs and notifies CPUs to set and start the output port PORTp of the decoding unit DECj, wherein the address of the display unit is PCISINKi, the display screen's size is DW*DH, the display screen's location in the decoded image is (X,Y), and the corresponding decoded image's area size is (SW*SH). DISPi is correlated with DECj through steps 2 and 3 in the system initialization.

At the phase of implementing synchronous transmission and synchronous tiled display, the following steps 4 to 9 are included:

4. DECj of CPUs outputs a frame of decoded image;

5. CPUs queries if display unit address PCISINKi of DECj's PORTp belongs to the PCIE address range of this processor, if it is, then it goes to step 7, otherwise it goes to step 6;

6. CPUs reads the read and write flags of RDIFi and WRIFi in the PCISINKi by PCIE, and if RDIFi→w==WRIFi→w, which denotes that the image buffer to which RDIFi→w in SINKi points is in idle state, CPUs zooms the image to the required size and then sends it to the image buffer by PCIE; if RDIFi→w!=WRIFi→w, CPUs sleeps for 1 millisecond and then continues querying until RDIFi→w==WRIFi→w after which the above operations are performed. After that, it goes to step 8.

7. CPUs transforms the PCISINKi address to local address SINKi, then reads the read and write flags of RDIFi and WRIFi in SINKi, and if RDIFi→w==WRIFi→w, which denotes that the image buffer to which RDIFi→w in SINKi points is in idle state, CPUs zooms the image to the required size and then sends it to the image buffer by PCIE; if RDIFi→w!=WRIFi→w, CPUs sleeps for 1 millisecond and then continues querying until RDIFi→w==WRIFi→w after which the above operations are performed. After that, it goes to step 8.

8. After DECj of CPUs has performed steps 5 to 7 on all enabled PORT, WRIFi→r=RDIFi→r is set and each WRFi→w is negated, which then are written to the corresponding PCISINKi or SINKi.

9. The display unit DISPi in CPUd queries for the read and write flags of RDIFi and WRIFi in SINKi according to a display refresh frequency. If RDIFi→r!=WRIFi→w, which denotes that the image buffer to which RDIFi→w points has new data, DISPi uses the image buffer as a storage area for source data to be displayed next time and updates the slave read information packet (RDIFi→r=WRIFi→w, RDIFi→w=WRIFi→w); if RDIFi→r==WRIFi→w, which denotes that the image buffer to which RDIFi-r points has no new data, DISPi repeatedly outputs the image data output last time;

The steps 4 to 9 in the phase of implementing synchronous transmission and synchronous tiled display go in cycles, and all the display unit(s) (only DISPi for this preferred example) correlated to DECj will obtain new data simultaneously.

The method embodiments of the present invention all can be realized by software, hardware and firmware etc. Regardless of the present invention is realized by software, or hardware, or firmware, the instruction codes can be stored in any type of computer accessible memory (such as permanent or can be modified, volatile or non-volatile, solid-state or non solid, fixed or replaceable medium etc.). Similarly, the memory can be, for example, programmable array logic (PAL), random access memory (RAM), programmable read only memory (PROM), read-only memory (ROM), electrically erasable programmable ROM (EEPROM), floppy disc, optical disc, and digital versatile disc (DVD) etc.

The fifth embodiment of the present invention relates to a multi-processor video processing system for video image synchronous transmission and display. FIG. 6 is a schematic structure diagram of the multi-processor video processing system for video image synchronous transmission and display. The multi-processor video processing system, as shown in FIG. 6(a), includes multiple processors comprising processor 1 to processor n which are connected via a PCIE bus; each processor comprises one or more display units and one or more decoding units as shown in FIG. 6(b); each display unit respectively comprises a corresponding group of memory area as shown in FIG. 6(c); each group of memory area comprises two buffers, a read information packet and a write information packet; the read information packet contains a read flag, and the write information packet contains a write flag. Each decoding unit corresponds to one or more display units, as shown in FIG. 6(b). The read information packet corresponding to the display unit is read-only for the decoding unit, and the write information packet corresponding to the display unit can be read and written by the decoding unit, whereas the read information packet corresponding to the display unit can be read and written by this display unit, and the write information packet corresponding to the display unit is read-only for this display unit.

The decoding unit is used for generating a frame of uncompressed image and respectively performing the following steps on each display unit corresponding to the decoding unit:

If the read and write flags corresponding to the display unit are equal, the decoding unit sends the image belonging to the display unit to an idle buffer indicated by the write flag by calling the PCIE bus or using local transmission inside the processor and negates the write flag, otherwise the decoding unit waits until the read flag is equal with the write flag.

The display unit is used for querying for corresponding read and write flags according to a display refresh frequency. If the read flag is not equal with the write flag, the display unit uses the buffer indicated by the read flag as a storage area for source data to be displayed next time and sets the read flag to the same value with the write flag.

The first embodiment is the method embodiment corresponding to this embodiment, and this embodiment and the first embodiment can be implemented in cooperation with each other. Correlated technical details disclosed in the first embodiment are still effective in this embodiment and will not be repeated here in order to reduce duplication. Correspondingly, correlated technical details disclosed in this embodiment can also be applied in the first embodiment.

The sixth embodiment of the present invention relates to a multi-processor video processing system for video image synchronous transmission and display.

The sixth embodiment improves the fifth embodiment, and the main improvements are described below: when a decoding unit sets M*N (M, N are positive integers) tiled display, the decoding unit can select corresponding display units and their number according to the video image's size and addresses and sizes of two buffers in the display unit's corresponding memory area.

The address of the image buffer in the information packet utilizes an offset mode relative to the information header, which enables the data transmission method, no matter PCIE bus transmission or local memory copy, to flexibly handle the buffer's address; if absolutely physical address is utilized, the address can be transformed once by PCIE bus alone, and if relative address is utilized, the buffer's address can be obtained by directly adding an offset to the information header's address without requirement of recalculating the buffer's location through system calls since the information header's address has been calculated. Specifically:

The read and write information packets further include the video image's size, the addresses and sizes of the two buffers in the memory area where the read and write information packets are located. The addresses of the two buffers utilize an offset mode.

Figure 7:
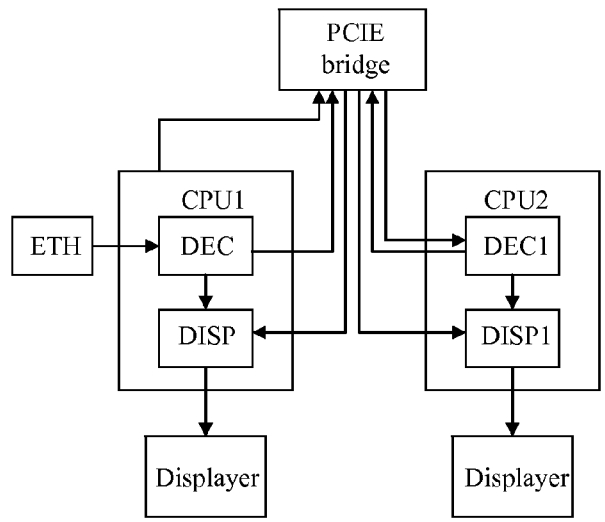
FIG. 7 is a schematic diagram of structure of a multi-processor video processing system for video image synchronous transmission and display and corresponding data flow in the sixth embodiment of the present invention.

As one preferred example of the present invention, the system structure, corresponding data flow and its direction are shown in FIG. 7.

Figure 8:
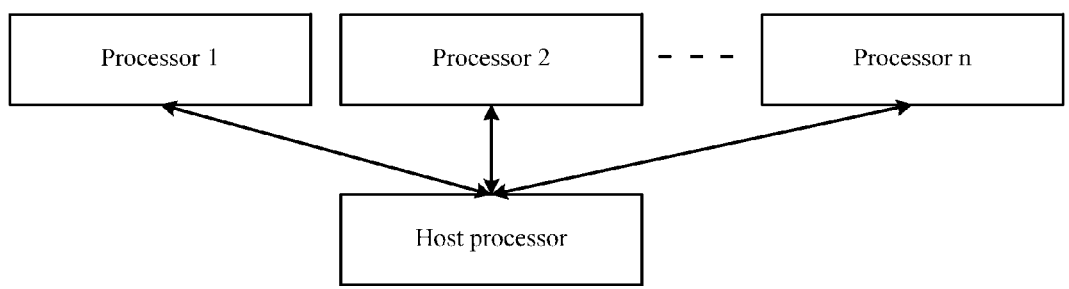
FIG. 8 is a schematic structure diagram of a multi-processor video processing system for video image synchronous transmission and display in the sixth embodiment of the present invention.

As one preferred example of the present invention, as shown in FIG. 8, the system includes multiple processors that are connected via the PCIE bus, wherein one of which is also a host processor.

The processor which is also a host processor can be either one of the multiple processors participating in synchronous transmission and display, or another independent processor. When the processor which is also a host processor acts as the host processor, it is only responsible for sending commands and does not participate in function implementation; when the processor which is also a host processor does not act as the host processor, it only participates in corresponding function implementation and does not send commands. Wherein, the processor which is also a host processor may be connected with other processors either by PCIE bus, or through other means like network etc.

The multi-processor video processing system is used for performing the following initialization before the step of the decoding unit performing video image synchronous transmission and display on each display unit corresponding to the decoding unit:

The processor(s) where each display unit is located respectively sets a group of memory area corresponding to each display unit in itself (themselves) memory space(s).

The host processor notifies the processor(s) where each display unit is located to start each display unit.

The processor(s) where each display unit is located initializes the read and write flags in the group of memory area, identifies the two buffers in this group of memory area as idle and returns each display unit's address to the host processor.

The host processor transforms each display unit's address to the address of PCIE bus address space, and notifies the decoding unit's processor to set and start the decoding unit's output port.

The output port's port information set by the decoding unit's processor includes each display unit's address of PCIE bus address space, display screen's size and the display screen's location in the original frame of image, the original frame of image's area size.

The second embodiment is the method embodiment corresponding to this embodiment, and this embodiment and the second embodiment can be implemented in cooperation with each other. Correlated technical details disclosed in the second embodiment are still effective in this embodiment and will not be repeated here in order to reduce duplication. Correspondingly, correlated technical details disclosed in this embodiment can also be applied in the second embodiment.

It should be noted that the units or modules disclosed in each system embodiment of the present invention are logic units or modules, physically, a logic unit or module can be a physical unit or module, and may be part of a physical unit or module, or implemented in combination of several physical units or modules, and physical implementing methods for these logic units or modules themselves are not the most important, instead, the combination of the functions achieved by these logic units or modules is the key to solving the technical problem disclosed in the present invention. Furthermore, in order to highlight innovative part of the present invention, the above system embodiments of the present invention do not introduce the units or modules which are not related closely to solving the technical problem to disclosed in the present invention, which does not indicate that the above system embodiments do not include other units or modules.

By referring to certain preferred embodiments of the present invention, the present invention has been shown and described. But it should be understood to those skilled in the art that various other changes in the forms and details may be made without departing from the principles and scope of the invention.

What claimed is:

1. A video image synchronous transmission and display method in a multi-processor video processing system, wherein the system includes multiple processors which are connected via a PCIE bus, each processor comprises one or more display units and one or more decoding units, each display unit respectively comprises a corresponding group of memory area, each group of memory area comprises two buffers, a read information packet and a write information packet, the read information packet contains a read flag, the write information packet contains a write flag; each decoding unit corresponds to one or more display units; the read information packet corresponding to the display unit is read-only for the decoding unit, and the write information packet corresponding to the display unit can be read and written by the decoding unit;

the method includes the following steps:
the decoding unit generating a frame of uncompressed image and respectively performing the following steps on each display unit corresponding to the decoding unit:
if the read and write flags corresponding to the display unit are equal, sending the image belonging to the display unit to an idle buffer indicated by the write flag by calling the PCIE bus or using local transmission inside the processor, and negating the write flag, otherwise waiting until the read flag is equal with the write flag;
each display unit querying for corresponding read and write flags according to a display refresh frequency, if the read flag is not equal with the write flag, using the buffer indicated by the read flag as a storage area for source data to be displayed next time, and setting the read flag to the same value with the write flag.

2. The video image synchronous transmission and display method according to claim 1, wherein the read and write information packets further include a video image's size, addresses and sizes of the two buffers in the memory area where the read and write information packets are located.

3. The video image synchronous transmission and display method according to claim 2, wherein the addresses of the two buffers in the memory area corresponding to the read information packet and the write information packet utilize an offset mode.

4. The video image synchronous transmission and display method according to claim 1, wherein the system includes multiple processors that are connected via the PCIE bus, one of the multiple processors is also a host processor;

before the step of the decoding unit performing video image synchronous transmission on each display unit corresponding to the decoding unit, the method further includes the steps of the system initialization:

respectively setting a group of memory area corresponding to each display unit in a memory space of the processor(s) where each display unit is located;
the host processor notifying the processor(s) where each display unit is located to start each display unit;
the processor(s) where each display unit is located initializing the read and write flags in the group of memory area, identifying the two buffers in the group of memory area as idle, and returning each display unit's address to the host processor;
the host processor transforming each display unit's address to the address of PCIE bus address space, and notifying the decoding unit's processor to set and start the decoding unit's output port.

5. The video image synchronous transmission and display method according to claim 1, wherein an output port's port information set by the decoding unit's processor includes each display unit's address of PCIE bus address space, display screen's size and the display screen's location in the original frame of image, the original frame of image's area size.

6. A video image synchronous display method, wherein a multi-processor video processing system includes multiple processors which are connected via a PCIE bus, each processor comprises one or more display units and one or more decoding units, each display unit respectively comprises a corresponding group of memory area, each group of memory area comprises two buffers, a read information packet and a write information packet, the read information packet contains a read flag, the write information packet contains a write flag; each decoding unit corresponds to one or more display units; the read information packet corresponding to the display unit is read-only for the decoding unit, and the write information packet corresponding to the display unit can be read and written by the decoding unit; the multi-processor video processing system further includes a synchronous transmission module having several synchronous channels;

the method utilized by the synchronous transmission module includes the following steps: traversing every synchronous channel, and if current synchronous channel has been enabled, performing the following steps on each display unit corresponding to the synchronous channel:
if it is required to send image to the display unit and there is an idle buffer in the memory area corresponding to the display unit, sending the image to the idle buffer of the display unit by calling the PCIE bus or using local transmission inside the processor;
if all images of the current synchronous channel have been sent, sending a synchronous information packet of the current synchronous channel and disabling the current synchronous channel.

7. The video image synchronous display method according to claim 6, wherein in the step of sending image to an idle buffer of the display unit by calling the PCIE bus or using local transmission, if the decoding unit and the display unit are in the same processor, the image is sent to the display unit's idle buffer by using local transmission inside the processor, and if the decoding unit and the display unit are not in the same processor, the image is sent to the display unit's idle buffer by calling a PCIE bus transmission.

8. The video image synchronous display method according to claim 6, wherein after the decoding unit generates a frame of uncompressed image, a synchronous channel is enabled first, and address of PCIE bus address space for the display unit(s) corresponding to the synchronous channel and this frame of image data are submitted to the synchronous channel, then a synchronous command is submitted to the synchronous channel;

the display unit queries if new video data has appeared in the buffer according to a video display refresh frequency, if new video data has appeared, the video data is displayed, later the buffer storing the video data is set to an occupied state, and the buffer occupied last time is set to an idle state.

9. The video image synchronous display method according to claim 6, wherein if all synchronous channels of the synchronous transmission module are not enabled or the display unit has not found an idle buffer, the synchronous transmission module sleeps for 1 ms.

10. A multi-processor video processing system utilizing video image synchronous transmission and display method, wherein the system includes multiple processors which are connected via a PCIE bus, each processor comprises one or more display units and one or more decoding units, each display unit respectively comprises a corresponding group of memory area, each group of memory area comprises two buffers, a read information packet and a write information packet, the read information packet contains a read flag, the write information packet contains a write flag; each decoding unit corresponds to one or more display units; the read information packet corresponding to the display unit is read-only for the decoding unit, and the write information packet corresponding to the display unit can be read and written by the decoding unit;

the decoding unit is used for generating a frame of uncompressed image and respectively performing the following steps on each display unit corresponding to the decoding unit:

if the read and write flags corresponding to the display unit are equal, sending the image belonging to the display unit to an idle buffer indicated by the write flag by calling the PCIE bus or using local transmission inside the processor, and negating the write flag, otherwise waiting until the read flag is equal with the write flag;

the display unit is used for querying for corresponding read and write flags according to a display refresh frequency, if the read flag is not equal with the write flag, the display unit uses the buffer indicated by the read flag as a storage area for source data to be displayed next time and sets the read flag to the same value with the write flag.

11. The multi-processor video processing system according to claim 10, wherein the read and write information packets further include a video image's size, addresses and sizes of the two buffers in the memory area where the read and write information packets are located, and the two buffers' addresses utilize an offset mode.

12. The multi-processor video processing system according to claim 10, wherein the system includes multiple processors that are connected via the PCIE bus, one of the multiple processors is also a host processor;

the system is used for performing the following initialization before the step of the decoding unit performing video image synchronous transmission and display on each display unit corresponding to the decoding unit:

the processor(s) where each display unit is located respectively setting a group of memory area corresponding to each display unit in itself (or themselves) memory space(s);

the host processor notifying the processor(s) where each display unit is located to start each display unit;

the processor(s) where each display unit is located initializing the read and write flags in the group of memory area, identifying the two buffers in the group of memory area as idle, and returning each display unit's address to the host processor;

the host processor transforming each display unit's address to the address of PCIE bus address space, and notifying the decoding unit's processor to set and start the decoding unit's output port.

13. The multi-processor video processing system according to claim 10, wherein an output port's port information set by the decoding unit's processor includes each display unit's address of PCIE bus address space, display screen's size and the display screen's location in the original frame of image, the original frame of image's area size.

* * * * *